(12) United States Patent
Szuchmacher et al.

(10) Patent No.: US 12,033,414 B2
(45) Date of Patent: Jul. 9, 2024

(54) DOCUMENT READABILITY ENHANCEMENTS

(71) Applicant: DocuSign, Inc., San Francisco, CA (US)

(72) Inventors: Santiago Szuchmacher, Seattle, WA (US); Keith Arthur Kriewall, Port Orchard, WA (US); David Todd Kriewall, Issaquah, WA (US); Brent Weston Robinett, Seattle, WA (US)

(73) Assignee: DOCUSIGN, INC., San Francisco, CA (US)

( * ) Notice: Subject to any disclaimer, the term of this patent is extended or adjusted under 35 U.S.C. 154(b) by 313 days.

(21) Appl. No.: 17/388,231

(22) Filed: Jul. 29, 2021

(65) Prior Publication Data

US 2023/0029752 A1 Feb. 2, 2023

(51) Int. Cl.
*G06K 9/00* (2022.01)
*G06F 40/14* (2020.01)
*G06F 40/186* (2020.01)
*G06N 20/00* (2019.01)
*G06V 30/414* (2022.01)
*G06V 30/416* (2022.01)

(52) U.S. Cl.
CPC .......... *G06V 30/414* (2022.01); *G06F 40/14* (2020.01); *G06F 40/186* (2020.01); *G06N 20/00* (2019.01); *G06V 30/416* (2022.01)

(58) Field of Classification Search
None
See application file for complete search history.

(56) References Cited

U.S. PATENT DOCUMENTS

| | | | | |
|---|---|---|---|---|
| 7,313,757 B2* | 12/2007 | Bradley | .............. | G06F 16/9538 715/222 |
| 8,103,956 B2* | 1/2012 | Trujillo | .............. | G09B 21/006 715/764 |
| 8,234,593 B2* | 7/2012 | Gordon | .............. | G06F 16/9577 715/239 |
| 11,372,920 B2* | 6/2022 | Berry | ................. | G06F 16/86 |
| 2002/0194219 A1* | 12/2002 | Bradley | ................ | G06F 40/117 725/9 |
| 2010/0070872 A1* | 3/2010 | Trujillo | .............. | G06F 3/04892 715/745 |

* cited by examiner

*Primary Examiner* — Maikhanh Nguyen
(74) *Attorney, Agent, or Firm* — Shumaker & Sieffert, P.A.

(57) ABSTRACT

Systems and methods are disclosed for receiving readout requests associated with reading the content of an electronic document by a screen reader application of a client device. In response, an electronic document system applies a document component identification model to the electronic document to generate indicia of at least one conventional segment for conventional readout using left-to-right, top-to-bottom readout and indicia of an unconventional segment to be read out in a manner different from the conventional readout. A document tree, representing a readout sequence, is constructed based on the at least one conventional segment and unconventional segments. The electronic document system provides the document tree to a screen reader, which may perform a readout based on the document tree.

17 Claims, 7 Drawing Sheets

Service Contract 305

The Service Contract ("Contract") is entered into as of the Effective Date by and between ABC, Inc. ("ABC") and XYZ, Co. ("Client"), having an address of 1234 2$^{nd}$ Street (together, "Parties") and sets forth the agreement between the Parties related to the following terms as defined in this Contract.

Section 1.1. Term of Contract. ← 310

The Term shall commence on August 2, 2021 and shall remain in effect for two (2) years. ← 315

Section 2.1. Payment Schedule.

320 →

| Payment Date | Payment Due | Late Fee |
|---|---|---|
| August 2, 2021 | $2000 | $500 August 31, 2021 $1,000 September 30, 2021 |
| February 2, 2022 | $2500 | $500 February 28, 2022 $1,000 March 31, 2022 |
| August 2, 2022 | $3000 | $500 August 31, 2022 $1,000 September 30, 2022 |
| February 2, 2023 | $3500 | $500 February 28, 2023 $1,000 March 31, 2023 |

↑ 325

---

Document Tree 330

< Document Tag 1 >

Read: "Service Contract"

... ← 335

< Document Tag 6 >

Read: "Payment Date ... Payment Due ... Late Fee ... August 2, 2021 ... $2,000 ... $500 August 31, 2021 ... $1,000 September 30, 2021 ... $2,500 ... $500 February 28, 2022 ... $1,000 March 31, 2022 ... August 2, 2022 ... $3,000 ... $500 August 31, 2022 ... $1,000 September 30, 2022 ... February 2, 2023 ... $3,500 ... $500 February 28, 2023 ... $1,000 March 31, 2023 ..."

FIG. 3A

Service Contract 305

The Service Contract ("Contract") is entered into as of the Effective Date by and between ABC, Inc. ("ABC") and XYZ, Co. ("Client"), having an address of 1234 2$^{nd}$ Street (together, "Parties") and sets forth the agreement between the Parties related to the following terms as defined in this Contract.

Section 1.1. Term of Contract. — 315

The Term shall commence on August 2, 2021 and shall remain in effect for two (2) years.

Section 2.1. Payment Schedule.

— 320

| Payment Date | Payment Due | Late Fee |
|---|---|---|
| August 2, 2021 | $2000 | $500 August 31, 2021 $1,000 September 30, 2021 |
| February 2, 2022 | $2500 | $500 February 28, 2022 $1,000 March 31, 2022 |
| August 2, 2022 | $3000 | $500 August 31, 2022 $1,000 September 30, 2022 |
| February 2, 2023 | $3500 | $500 February 28, 2023 $1,000 March 31, 2023 |

— 325

Document Tree 340

< Document Tag 1 >

Read: "Service Contract"

... — 345

< Document Tag 5.1 >

Read: "Section 1.1 Terms of Contract, section one of twenty."

... — 350

< Document Tag 6.1 >

Read: "Payment Date ... August 2, 2021 ... Payment Due ... $2,000 ... Late Fee ... $500 August 31, 2021 ... $1,000 September 30, 2021"

...

< Document Tag 6.10 >

Read: "Payment Date ... February 2, 2023 ... Payment Due ... $3,500 ... Late Fee ... $500 February 28, 2023 ... $1,000 March 31, 2023"

< Document Tag 6.3 >

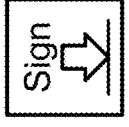
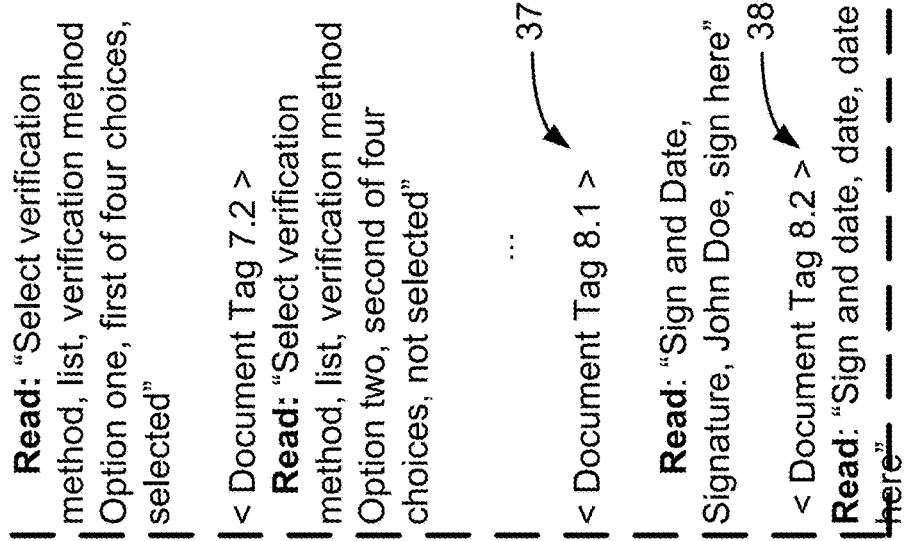
FIG. 3C

400

```
┌─────────────────────────────────────────┐
│ Receive readout request associated with │
│          an electronic document         │
│                   410                   │
└─────────────────────────────────────────┘
                    │
                    ▼
┌─────────────────────────────────────────┐
│ Apply a document component identification│
│ model to generate indicia of at least one│
│ conventional segment and indicia of an  │
│          unconventional segment         │
│                   420                   │
└─────────────────────────────────────────┘
                    │
                    ▼
┌─────────────────────────────────────────┐
│ Construct document tree based on the at │
│ least one conventional segment and      │
│          unconventional segment         │
│                   430                   │
└─────────────────────────────────────────┘
                    │
                    ▼
┌─────────────────────────────────────────┐
│   Provide the document tree to a screen │
│                   reader                │
│                   440                   │
└─────────────────────────────────────────┘
```

FIG. 4

DOCUMENT READABILITY ENHANCEMENTS

TECHNICAL FIELD

This disclosure generally relates to electronic document systems, and specifically to document readability enhancements.

BACKGROUND

Current systems that generate accessible documents are not adapted to cope with the different content types (such as images, form fields, tables, and charts) that are added to documents in portable document format (PDF) after the original PDF is created. Specifically, current systems are designed with conventions, such as a top-down, left-to-right readout of text, and some modern features are not intended to be read according to such a convention. Moreover, current systems consider a time features were added to a document, irrespective of the location of the feature within the document. Thus, screen reader output rendered from those accessible documents is often incomprehensible and gives the screen reader user little context. This is increasingly problematic as more documents are provided to recipients electronically and without accessibility tools, such as braille.

SUMMARY

Systems and methods are disclosed herein for generating document readability enhancements. In various embodiments, the electronic document system identifies portions of an electronic document that includes zero conventional segments, one conventional segment, or at least one conventional segment, such as paragraph text, and portions of the electronic document that includes one or more unconventional segments, such as a table or chart. In addition, the electronic document system may identify one or more tabs added to the electronic document via a user interface of the electronic document system. Based on the conventional segments, unconventional segments, and/or tabs, the electronic document system generates a document tree that is used to produce a readout sequence to be performed by a screen reader. The process of generating a document tree takes the desired readout sequence content, context, order, location, etc., of items within the documents into account when generating a document tree such that each portion of the document is comprehensible when rendered by a screen reader application. Further, the electronic document system helps ensure that a readout sequence associated with an electronic document is performed in a similar manner irrespective of the platform on which it is being performed, including browsers, software, etc. In addition to generating document trees, the electronic document system may cause a portion of the electronic document be to visually accentuated as it is read aloud by the screen reader, further increasing document accessibility. For example, the electronic document system may cause a screen reader to highlight, increase the font size, change the font type, etc., of a portion of the electronic document as it is read aloud by the screen reader.

In an embodiment, an electronic document system receives a readout request associated with reading the content of an electronic document by a screen reader application of a client device. In response to receiving the readout request, the electronic document system applies a document component identification model to the electronic document to generate indicia of at least one conventional segment for conventional readout and indicia of unconventional segments to be read out in a manner different from the conventional readout. An unconventional segment may be a collection of random characters that together form a chart, a table, a signature block, a button, a checkbox, or the like. In some embodiments, conventional readout uses left-to-right, top-to-bottom readout. In other embodiments, conventional readout is based on the language of the electronic document (e.g., readout conventions of other countries or cultures, such as from right-to-left in Hebrew), user preferences, or the like. The document component identification model may be a template comparison model. Alternatively, or additionally, the document component identification model is a machine learning model.

A document tree, representing a readout sequence, is constructed based on the at least one conventional segment and unconventional segments. The document tree represents a readout sequence to be performed by a screen reader application. The electronic document system provides the document tree to a screen reader, which may perform a readout based on the document tree. In some embodiments, the electronic document system generates a document tag for the at least one conventional segment and the unconventional segment. Document tags may include data about the content, location, size, segment type, etc., of a corresponding segment. In these embodiments, the electronic document system can construct a document tree using document tags. The electronic document system may update the document tree by adding one or more additional document tags to the document tree, modifying one or more document tags of the document tree, removing one or more document tags from the document tree, or the like. The document tree may be updated in response to a conventional segment being added, modified, and/or removed. In addition, the document tree may be updated in response to an unconventional segment being added, modified, and/or removed.

BRIEF DESCRIPTION OF THE DRAWINGS

FIG. 3A illustrates an example user interface of the electronic document system and an example document tree without document readability enhancements, according to one embodiment.

FIG. 3B illustrates an example user interface of the electronic document system and an example document tree with document readability enhancements, according to one embodiment.

FIG. 3C illustrates an example user interface of the electronic document system and an example document tree with document readability enhancements, according to one embodiment.

FIG. 4 is a flowchart of a method for enhancing document readability, according to one embodiment.

Figure 1:
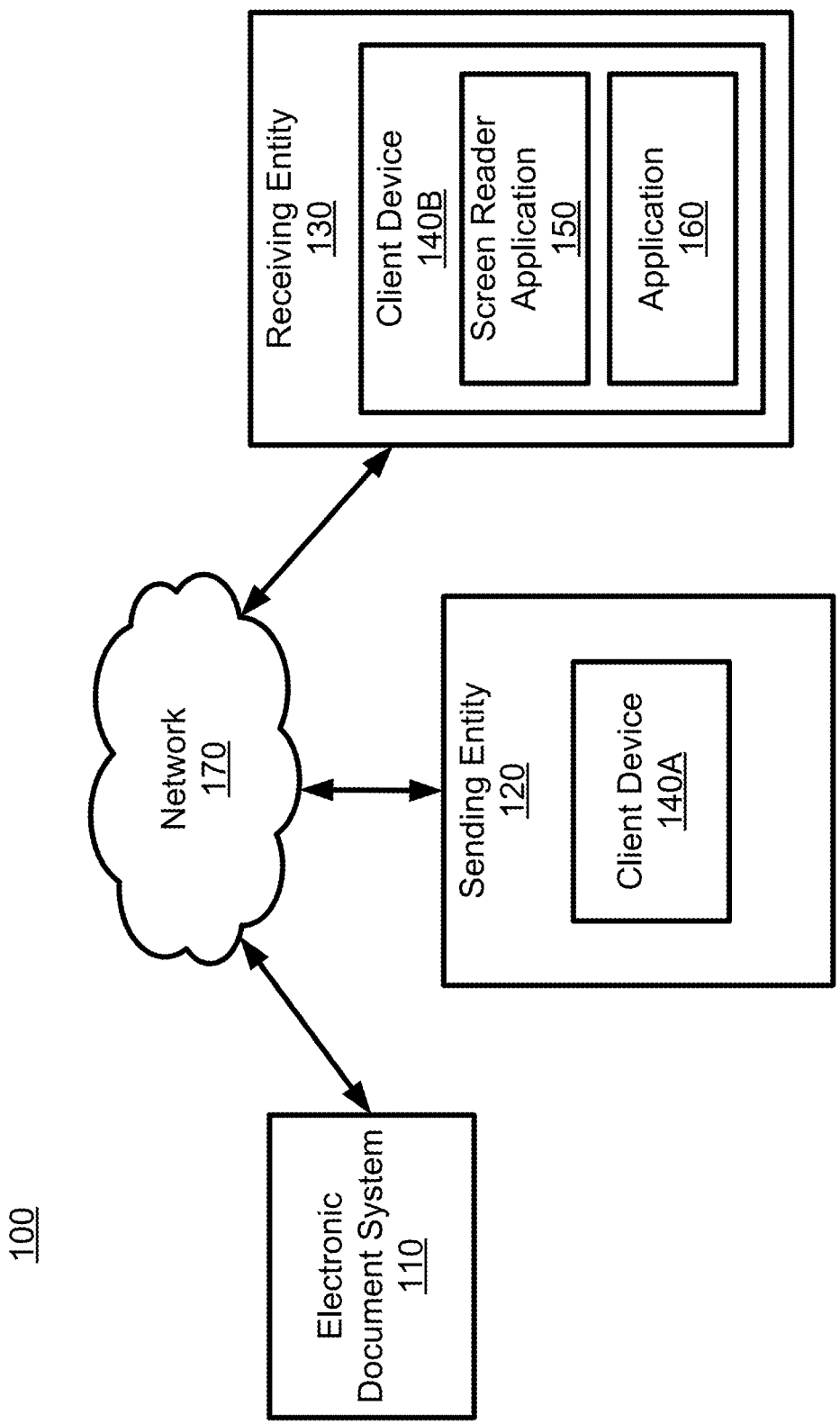
FIG. 1 illustrates a diagram of a system environment of an electronic document system, according to one embodiment.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables entities to create, send, receive, and execute documents for negotiation, collaborative editing, electronic execution (e.g., electronic signature), automation of contract fulfillment, archival, and analysis, among other tasks, with other entities. Within the system environment, an entity may review content and/or terms presented in a document, and in response to agreeing to the content and/or terms, can electronically execute the document. In some embodiments, the entities may request a readout of an electronic document by a screen reader application. In these embodiments, the electronic document system constructs a document tree of the electronic document based on the contents, structure, metadata, or the like, of the electronic document. The electronic document system provides the document tree to the screen reader application such that the screen reader may perform a readout based on the document tree associated with the electronic document.

The system environment described herein can be implemented within an electronic document system, a centralized document system, an online document system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

FIG. 1 illustrates a diagram of a system environment 100 of an electronic document system 110, according to one embodiment. The system environment 100 shown by FIG. 1 includes the electronic document system 110, a sending entity 120, a receiving entity 130, a plurality of client devices, such as client device 140A associated with the sending entity 120 and client device 140B associated with the receiving entity 130 and including a screen reader application 150 and an additional application 160.

The electronic document system 110 is a computer system (or group of computer systems) for storing and managing documents, copies (also referred to as envelopes), and/or batches of copies for a plurality of users (e.g., the sending entity 120 and the receiving entity 130). Using the electronic document system 110, users can collaborate to create, edit, review, negotiate, and execute documents. A document may be a contract, agreement, purchase order, or any other document.

The electronic document system 110 receives electronic documents from one or more client devices via the network 170. Electronic documents may be received in any suitable format, such as portable document format (PDF), portable network graphics (PNG), joint photographic group (JPG), or the like. The electronic document system 110 generates document trees associated with electronic documents based on the contents, structure, metadata, etc., associated with the electronic document. A document tree is used by accessibility tools, such as screen reader application 150, to render content as speech and/or braille. In some embodiments, a document tree associated with an electronic document comprises document tags associated with various portions of the electronic document, as described in detail below with reference to FIG. 2.

The electronic document system 110 enables users to modify electronic documents via one or more interface elements of a user interface provided by the electronic document system 110. Users may modify electronic documents by adding tabs (also called fields) to the electronic document. In some embodiments, tabs are placed within an electronic document in which a recipient provides input (such as signature, name, address, company name, etc.), where a calculated value is displayed, or the like. Tabs may be associated with a set of characteristics, such as a type, a set of input parameters specifying a required input, a location, or the like.

The electronic document system 110 may receive requests from an entity to place one or more tabs within the electronic document. Responsive to the request, the electronic document system 110 may determine whether the requesting entity has the permissions needed to place one or more tabs. In some embodiments, tab placement may be restricted to sending entities. In other embodiments, sending entities and/or receiving entities may place tabs onto an electronic document. Alternatively, or additionally, the electronic document system 110 may, within a request, detect locations of text within the electronic document to precede and/or follow the tab to provide a guide for placement of a corresponding document tag within a document tree. Detection may be based on the type of tab being added, text included in the tab, form text of the electronic document, user input, or the like. For example, the electronic document system 110 may enable users to specify text that comes before and/or after the tab to provide a guide for where a corresponding document tag is placed within a document tree. In addition, the electronic document system 110 may allow users to specify a location of the tab within the document, a location of a corresponding document tag within a document tree, or the like. In addition, the electronic document system may use one or more suitable processing techniques to detect form text within electronic documents and determine a location for the tab within the electronic document and/or a location of the corresponding document tag within the document tree. For example, the electronic document system 110 may use natural language processing (NLP), optical character recognition (OCR), one or more machine learning models, one or more heuristics, or a combination thereof for text detection, tab placement, and/or document tag placement.

When a tab has guidance relative to an existing document tag, the document tag associated with the tab is inserted immediately before, at (e.g., through replacement), or immediately after that document tag. In the absence of explicit guidance, the location of the tab on the page is used to infer guidance. If an existing document tag for that location is for replaceable content (e.g., a "form field"), the document tag associated with the tab is inserted at that document tag (e.g., through replacement). Otherwise, cells, as determined by the various processing techniques, are searched to find the innermost enclosing cell. The document tag associated with the tab is then inserted before or after an existing document tag in the cell (e.g., a sibling), if any, per the readout conventions of the embodiment.

The electronic document system 110 can be a server, server group or cluster (including remote servers), or another suitable computing device or system of devices. In some implementations, the electronic document system 110 can communicate with client devices over the network 170 to receive instructions and send copies (or other information) for viewing on client devices. The electronic document system 110 will be discussed in further detail with reference to FIG. 2.

The sending entity 120 prepares and sends copies of a set of documents to a plurality of receiving entities, such a receiving entity 130, via the electronic document system 110. For example, the sending entity 120 instructs the electronic document system 110 to prepare and send electronic documents with corresponding document trees to a plurality of receiving entities. The sending entity 120 may be an individual, an organization, a company, a group, an account, etc. The sending entity 120 can be associated with a user account, username, email address, or other identifier that can be used by the electronic document system 110 to identify the sending entity 120 and to control the ability of the sending entity 120 to view, modify, and otherwise interact with the copy managed by the electronic document system 110.

In some implementations, the sending entity 120 can interact with the electronic document system 110 through a user account with the electronic document system 110 and one or more client devices accessible to that sending entity 120, such as client device 140A. The sending entity 120 may be an administrator who created the electronic documents and/or who has authority to view, edit, and/or send the copies of the documents. In an example implementation, the sending entity 120 may be a human resource representative for an organization. The representative requests the electronic document system 110 to prepare and send copies of a set of accessible, electronic documents to a plurality of receiving entities, such as receiving entity 130 for execution. Each receiving entity 130 may receive a distinct copy of the set of accessible, electronic documents and corresponding document tree(s) based on data unique to the receiving entity 130, such as the name, date of birth, employment status, etc., of the receiving entity.

The receiving entities, such as receiving entity 130, (also referred to as recipients) receive copies of the set of electronic documents. Each receiving entity 130 may receive a distinct copy of the set of documents. A receiving entity 130 may be an individual, an organization, a company, a group, an account, etc. In some embodiments, a receiving entity 130 may be associated with a user account, username, email address, or other identifier that is used by the electronic document system 110 to identify the receiving entity 130 and to control the ability of the receiving entity 130 to view, modify, and otherwise interact with the copy of the set of documents and/or the set of documents managed by the electronic document system 110. For example, a receiving entity 130 can interact with the electronic document system 110 through a user account with the electronic document system 110 and one or more client devices accessible to that receiving entity 130, such as client device 140B. In some embodiments, the sending entity 120 and a receiving entity 130 may be associated with the same organization and/or the same company.

The receiving entities 130 can perform one or more actions associated with a received copy of the set of electronic documents. For example, a receiving entity 130 can view, edit, decline, and/or execute one or more documents within the copy. A receiving entity 130 may perform any of the one or more actions via the electronic document system 110. Moreover, the receiving entity 130 may request a readout of an electronic document associated with reading out content of one or more documents in the set of documents by a screen reader application 150.

Client device 140B, as depicted, has application 160 installed thereon. Any or all client devices in environment 100 may have application 160 installed thereon. Application 160 may be a stand-alone application downloaded by a client device from the electronic document system 110. Alternatively, the application 160 may be accessed by way of a browser installed on the client device, accessing an application instantiated from the electronic document system 110 using the browser. In the case of a stand-alone application, browser functionality may be used by application 160 to access certain features of the electronic document system 110 that are not downloaded to the client device. Application 160 may be used by a client device to perform any activity relating to an electronic document, such as to create, design, assign permissions, circulate, access, sign, modify, add pictorial content, add accessibility information, or the like. For example, a sending entity 120 and/or receiving entity 130 may interact with one or more electronic documents via the application 160 by uploading, modifying, sending, executing, etc., electronic documents using the application 160.

Each client device 140A, 140B is a computing device capable of receiving user input as well as transmitting and/or receiving data to the electronic document system 110 via the network 170. For example, a client device 140A, 140B can be a desktop or a laptop computer, a smartphone, tablet, or another suitable device. Client devices 140A, 140B are configured to communicate via the network 170. In one embodiment, a client device executes an application allowing a user of the client device to interact with the electronic document system 110. For example, a client device 140A, 140B can execute a browser application to enable interaction between the client device 140A, 140B and the electronic document system 110 via the network 170. In some embodiments, a single user can be associated with multiple client devices 140A, 140B, and/or one client device 140A, 140B can be shared between multiple users who may, for example, log into a personal account on the client device 140A, 140B to access the electronic document system 110. In some embodiments, the client device includes a user interface that displays documents for execution.

The network 170 transmits data within the system environment 100. The network 170 may comprise any combination of local area and/or wide area networks, using both wired and/or wireless communication systems, such as the Internet. In some embodiments, the network 170 transmits data over a single connection (e.g., a data component of a cellular signal, or Wi-Fi, among others), and/or over multiple connections. In some embodiments, the network 170 uses standard communications technologies and/or protocols. For example, the network 170 includes communication links using technologies such as Ethernet, 802.11, 3G, 4G, code division multiple access (CDMA), digital subscriber line (DSL), and the like. Data exchanged over the network 170 may be represented using any suitable format, such as hypertext markup language (HTML) or extensible markup language (XML). In some embodiments, the network 170 may include encryption capabilities to ensure the security of customer data. For example, encryption technologies may include secure sockets layers (SSL), transport layer security (TLS), virtual private networks (VPNs), and Internet Protocol security (IPsec), among others.

Electronic Document System

Figure 2:
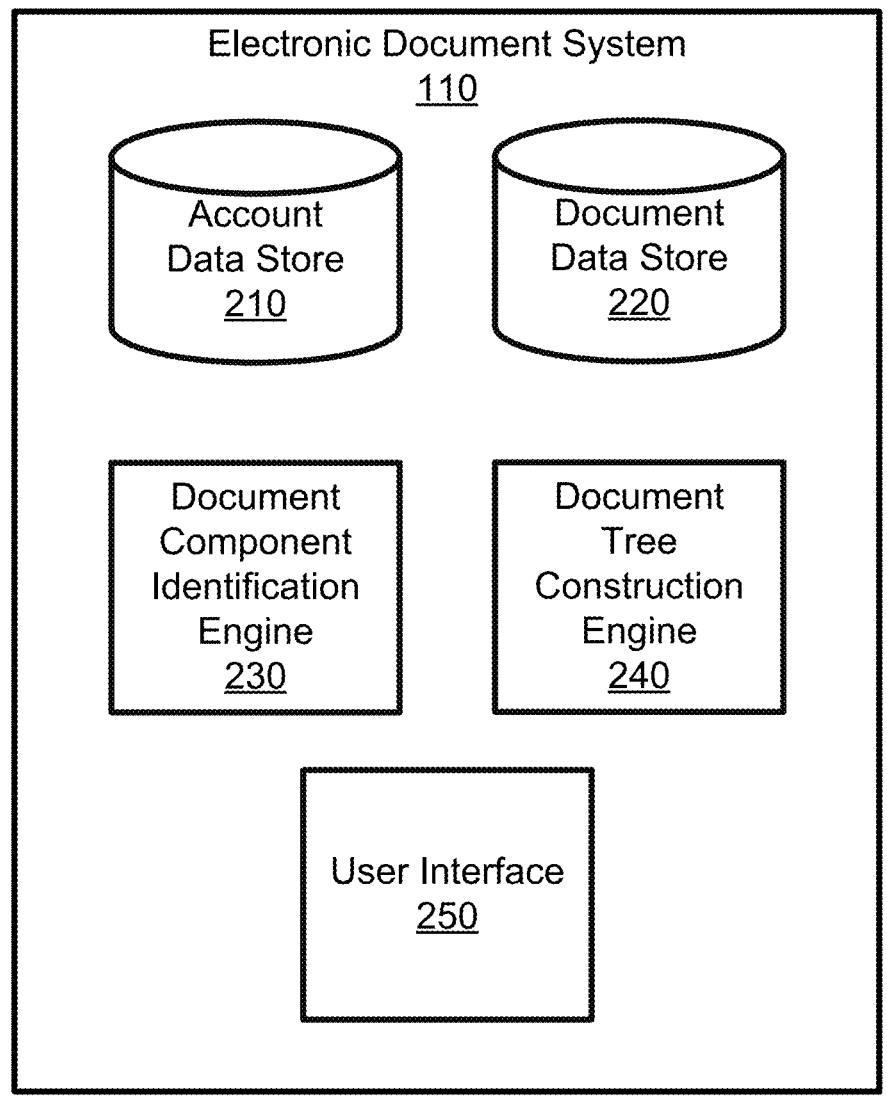
FIG. 2 illustrates a block diagram of the electronic document system, according to one embodiment.

FIG. 2 is a block diagram of an electronic document system 110, in accordance with an embodiment. Components of the electronic document system 110 may be a combination of hardware and software. The electronic document system 110 may include an account data store 210, a document data store 220, a document component identification engine 230, a document tree construction engine 240, and a user interface 250. In various embodiments, the electronic document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the electronic document system 110 may be distributed among the components in a different manner than described.

The electronic document system 110 maintains information associated with accounts of the electronic document system 110 in the account data store 210. The account data store 210 is a file storage system, database, set of databases, or other data storage system storing information associated with accounts of the electronic document system 110. Entities (e.g., sending entity 120, receiving entity 130, etc.) may be associated with one or more accounts of the electronic document system 110. Each account associated with an entity may include information about the entity, such as information about individual(s) with access to the account, age of the account, frequency of account use, log of past account transactions, or the like. Information about the individual(s) with access to the account may include the individual's name, email address, address, title, role, department, and the like. In addition, information may include accessibility information, such as whether an entity requires documents to be accessible, preferred accessibility tools and/or formats, or the like. For example, accessibility information may indicate that at least a portion of documents corresponding to an entity must be compatible with a screen reader application, such as screen reader application 150.

The electronic document system 110 stores electronic documents and information about the electronic documents in the document data store 220. Document information may include information about the content and/or structure of the electronic documents, such as whether the document contains paragraph text, headers, tables, charts, form fields, images, audio, etc. Further, the document information may include document metadata. Document metadata may include, but is not limited to, the type of document, document author, document owner, permissions, time of creation, log of modifications made to the document, time of execution by one or more entities, or the like.

Document information may also include tab information, execution information, and/or accessibility information. Tab information may include, but is not limited to, whether one or more tabs have been added to an electronic document, which tabs were added, the text associated with the tabs, the locations of the tabs, which entity added a tab to a document, which entity is required to input data into a tab, whether input for a tab has been provided, which entity provided input, or the like. Execution information may include, but is not limited to, whether a document has been executed, which entities are required to execute the document, which entities receive copies of the executed document, where to send executed documents, or the like. Accessibility information may include, but is not limited to, information indicating whether the document is associated with a document tree, the contents of the document tree, the number of document tags in the document tree, the types of document tags within the document tree, the document content associated with the document tags, the locations of content associated with document tags, a readout sequence of the document tags within the document tree, or the like.

The document component identification engine 230 determines a content type associated with various portions of an electronic document. In some embodiments, the document component identification engine 230 identifies which portions of an electronic document are associated with conventional segments and which portions of the electronic document are associated with unconventional segments. An electronic document may have zero conventional segments, one conventional segment, or more than one unconventional segment. Conventional segments are portions of an electronic document that may be read using a conventional readout and remain comprehensible when rendered by a screen reader, such as paragraph text. In some embodiments, a conventional segment may be a document segment that is not characterized as an unconventional segment. Conventional readouts may vary regionally and based on the language of the text being rendered. For example, conventional readout may include left-to-right, top-to-bottom readout, right-to-left, top-to-bottom readout, etc.

Unconventional segments are portions of an electronic document that are read by the screen reader in a manner different from a conventional readout. In some embodiments, there are multiple different types of unconventional segments. Types of unconventional segments may include, but are not limited to, tables, charts, field forms, cells, buttons, check boxes, lists, section headers, or the like. A readout associated with an unconventional segment may be based on its corresponding segment type. For example, for the value of a cell to be comprehensible when read by a screen reader, the row name and/or column name is provided in addition to the value of the cell, providing context to the cell value. In another example, for a list of items to be comprehensible, the relationship between the items in the list may be provided to give context to any given list item. In this example, the name of the list, the number of items in the list, and/or the position of an item within the list may be provided to give context to the list value. In some embodiments, the document component identification engine 230 identifies unconventional segments without identifying conventional segments.

The document component identification engine 230 extracts document text and/or structure from electronic documents. The document component identification engine 230 may detect unconventional segments within the document, such as charts, form fields, tables, check boxes, buttons, headers, lists, etc. Detection may be based on drawn lines within the document, such as lines forming a visual box, a location within the document, size, font, or any other suitable cue indicating a segment is not a conventional segment. Cues may vary based on the type of unconventional segment and/or based on the construction of the unconventional segment, which may not be uniform across all unconventional segments of the same type. For example, a table may be constructed using a table making function of a word processor. Alternatively, a table may be constructed using individual lines, text boxes, and/or tab stops placed within a page. As a further example, a list may be constructed using a style formatting tool of a word processor. There, each list item may be associated with a bullet point or other symbol. Alternatively, a list may be constructed by placing lines of plain text into an electronic document, each preceded by a plain text symbol. Accordingly, the document component identification engine 230 can detect unconventional segments of the same type but of a different construction.

The document component identification engine 230 may extract and/or reconstruct metadata from the electronic document. The document component identification engine 230 may do this because information may get lost during an uploading process to the electronic document system 110, burned into the document, or the like. Metadata may be based on the type of segment. In some embodiments, metadata for form fields may include, but is not limited to, the type of field, tool tip, whether the fields are grouped, how many elements are in the group, the position of the element within the group, or the like. In some embodiments, metadata for tables includes, but is not limited to, the location of a cell within a table, whether the cell spans rows, whether the cell spans columns, or the like.

The document component identification engine 230 may determine which portions of the electronic document are conventional segments or unconventional segments using heuristics. Additionally, or alternatively, the document component identification engine 230 may determine which portions of the electronic document are unconventional segments using heuristics without detecting which portions of the electronic document are conventional segments. In some embodiments, the document component identification engine 230 identifies conventional segments and unconventional segments using a template comparison model. The template comparison model compares portions of the electronic document to templates stored by the electronic document system 110. The electronic document system 110 may store templates for different types of conventional and unconventional segments in one or more databases. Templates may include one or more attributes and/or predefined properties, such as whether the template includes a table, whether a cell contains a sub-cell, whether the template includes more than one type of unconventional segment, a document type associated with the template (e.g., a tax form, an employment contract, etc.), or the like.

In some embodiments, the document component identification engine 230 inputs extracted text, extracted structure, extracted and/or reconstructed metadata, or the like, into the template comparison model. The template comparison model may determine a segment type for one or more portions of an electronic document based on a comparison between the templates and portions of the electronic document. Output of the template comparison model may be based on a threshold similarity between a template and a portion of the electronic document. Alternatively, or additionally, the output may be based on a threshold number of similar attributes and/or predefined properties, a similarity score among different attributes and/or predefined properties, a threshold number of dissimilarities, or the like.

In some embodiments, the document component identification engine 230 determines which portions of an electronic document are conventional segments and/or unconventional segments using one or more machine learning models. In these embodiments, the document component identification engine 230 trains one or more machine learning models stored in one or more databases of the electronic document system 110. The machine learning models may be supervised or unsupervised models. For supervised learning, training data may include one or more conventional segment types, one or more unconventional segment types, content of the segment, attributes of a receiving or sending entity associated with the segment, attributes of the segment (e.g., metadata attributes showing creator, access privileges, date of creation, place of creation, and any other attribute), and any other aspect of the document. The training data may be paired with one or more labels (e.g., applied manually or automatically), the one or more labels naming a segment type of a segment. One or more machine learning models may be trained using the document component identification engine 230 to take as input attributes of a segment and to output segment types and/or information from which segment types may be derived (e.g., probabilities of requirements, to be compared, for example, to thresholds to determine whether the requirements should be applied). The trained models may be stored in one or more databases of the electronic document system 110 for use by the document component identification engine 230.

In some embodiments, the document component identification engine 230 may determine which portions of the electronic document are unconventional segments using one or more machine learning models without detecting which portions of the electronic document are conventional segments. Training data and/or model parameters may differ from those used when machine learning models detect the presence of both conventional and unconventional segments. In addition, the document component identification engine 230 may train separate machine learning models that are each associated with a segment type, document type, entity, accessibility needs, or the like. For example, the document component identification engine 230 may train one or more machine learning models to detect tables, one or more machine learning models to detect charts, one or more machine learning models to detect form cells, or the like.

The document tree construction engine 240 constructs document trees to be rendered by a screen reader. A document tree defines a readout sequence that indicates an order in which portions of the electronic document are read aloud by the screen reader. The document tree construction engine 240 may construct a document tree for an electronic document based on the conventional and/or unconventional segments identified by the document component identification engine 230. Document tree construction may be further based on the language of the document, document providers and/or recipients, user preferences, document metadata, tabs added to the electronic document, or the like.

The document tree construction engine 240 may ensure that the user experience with a readout sequence is the same across platforms by modifying the format of the document tree based on the platform. As an example, the document tree construction engine 240 ensures that a readout sequence provided during execution of an electronic document in a browser is the same as that provided after the document has been downloaded to a local device and is accessed through a local application of the device. In this example, the document tree construction engine 240 may generate a document tree that includes an original electronic document and one or more tabs that were added to the document in standard file format, such as JSON. The document tree construction engine 240 may transform the tree into a format that is compatible with a browser (e.g., html, XML DOM, etc.) and a format that is compatible with a local application (e.g., a pdf reader).

In some embodiments, to construct a document tree, the document tree construction engine 240 determines document tags for the zero or more conventional segments, unconventional segments, and/or tabs in the electronic document. The document tree construction engine 240 may determine document tags based on output from the document component identification engine 230, data stored in one or more databases of the electronic document system 110, data received from one or more entities over a network 170, or the like. A document tag may include information about a type of a corresponding segment, readout instructions and/or language for a screen reader, a location of the document tag within the document tree, a status of the segment (e.g., whether a button has been selected), text of the corresponding segment, a geometry of the segment, a dimension of the segment, metadata associated with the segment, etc.

In some embodiments, the document tree construction engine 240 determines document tags for tabs associated with the electronic document system 110 that have been placed onto the electronic document. For example, an electronic document may include a signature tab that was placed onto the electronic document after it was uploaded to the electronic document system 110. The document tags associated with the tabs may indicate a location of the tab within the electronic document, tab input required by a recipient of the electronic document, text included with the tab, text to be included in the document tag, a readout order of the text, or the like. Recipients may provide a location of the tab within the electronic document when the tab is placed. In these embodiments, the document tree construction engine 240 may determine the location of the document tag within the document tree based on the provided location. In other embodiments, the document tree construction engine 240 may determine a location of the tab within the document. Based on the determined location, the document tree construction engine 240 may determine a location of the corresponding document tag within the document tree. The document tree construction engine 240 may determine a location of the tab within the electronic document based on the text and structure extracted by the document component identification engine 230, attributes of the tab, metadata of the tab, document, individual segments within the electronic document, or the like. For example, a tab associated with an input value may be placed within a cell of a table of an electronic document. The document tree construction engine 240 may determine the location of the tab within the table. The document tree construction engine 240 may insert a document tag associated with the tab based on the determined location.

In some embodiments, electronic documents uploaded to the electronic document system 110 include tags corresponding to an accessibility tree. The document component identification engine 230 may give portions of the electronic document unique identifiers before modifying the electronic document and/or identifying conventional and unconventional segments within the electronic document. The document tree construction engine 240 can use the unique identifiers to place document tags corresponding to those portions into a document tree with and/or without the use of heuristics.

The user interface 250 allows account holders to provide documents for execution, compile and distribute envelopes, join and create networks, receive and execute documents, using various elements of the user interface 250. The user interface 250 also allows account holders to modify account settings, configure network requirements, connect with other account holders, and the like. Further, the user interface 250 may allow recipients that do not hold accounts with the electronic document system 110 to receive and execute envelopes for execution. In some embodiments, the user interface 250 visually accentuates a portion and/or segment of the document as a screen reader performs a readout. A portion may be visually accentuated based on instructions in the document tree, in a document tag, user preferences, or the like. The user interface 250 may visually accentuate a portion of an electronic document by highlighting the portion of the document, increasing the font size of the portion, changing the font type, blurring one or more other portions of the electronic document, or the like.

FIG. 3A illustrates an example user interface of the electronic document system 110 and an example document tree without document readability enhancements, according to one embodiment. As shown, the user interface 300 is an electronic document 305 with paragraph text 310, section headers 315, and a table 320 with multiple cells (e.g., cell 325). The corresponding document tree 330 shown was created without the document readability enhancement generated by the electronic document system 110. The document tree 330 includes multiple document tags, such as document tag 335, which corresponds to the table 320. Without the readability enhancements, the attributes of the unconventional segments of the document, including the section header 315 and the table 320, are not considered when the document tree is constructed. Thus, when a screen reader performs a readout sequence corresponding to the document tree 330, the information contained in the unconventional segments may be incomprehensible. For example, the document tag 335 corresponding to table 320 instructs the screen reader to read the contents of each cell from left to right and top to bottom. Accordingly, when a screen reader reads the late fee values in cell 325, only the values in cell 325 are provided (e.g., "$500 Feb. 28, 2023 $1000 Mar. 31, 2023"). The context of the cell, such as the row name and/or column name are not provided. Thus, while the cells may be easily understood by a reader who can visualize the context of each cell within the table 320, a screen reader does not provide that same context.

FIGS. 3B-3C illustrates example user interfaces of the electronic document system 110 and example document trees with document readability enhancements, according to one embodiment. FIG. 3B illustrates an example user interface 300 displaying a portion of the electronic document 305 including a section header 315 and a table 320 and the corresponding portion of a document tree 340. FIG. 3C illustrates the user interface 300 displaying a portion of the electronic document 305 including a list 355, a signature and date block 360, and a signature tab 365 placed within the signature and date block 360, and the corresponding portion of the document tree 340.

As shown in FIG. 3B, the electronic document 305 includes a section header 315 and a table 320 with multiple cells, including cell 325. Each segment in the electronic document 305 is associated with a document tag, such as document tag 345 and document tag 350. In the embodiment shown, section header 315 is associated with document tag 345. Thus, when the screen reader performs the portion of the readout including the section header 315, it will inform the screen reader user that a new section is beginning and of the context of the section within the document. As shown, document tag 345 includes an instruction to read the name of the section header (e.g., "Section 1.1. Term of Contract") and indicate the position of the section within the document (e.g., "section one of twenty").

Similarly, table cell 325 is associated with document tag 350. When the screen reader performs the portion of the readout including table cell 325, it will inform the screen reader user that the cell value includes late fees associated with the Feb. 2, 2023 payment date. In some embodiments, each cell is associated with a single document tag. In other embodiments, a document tag may be associated with more than one cell, such as a row of cells, a column of cells, or the like.

In the embodiment shown, the electronic document system 110 highlights portions of the text as they are read aloud by a screen reader, an accessibility tool that may be helpful for partially-sighted screen reader users. In alternative embodiments, the electronic document system 110 may visually accentuate portions of the text in other ways, such as by increasing the font size, changing the font type, or the like.

As shown in FIG. 3C, the electronic document 305 includes a list 355 with checkboxes, a signature and date block 360, and a signature tab 365 inserted into the electronic document 305 via a user interface 250 of the electronic document system 110. In the illustration provided, the list 355 is associated with multiple document tags, including document tag 370, that are each associated with a list item. While the contents of the list may be comprehensible when read left-to-right and top-to-bottom, document tags shown provide context to the screen reader user that is not otherwise provided. For example, document tag 370 indicates the name of the list (e.g., "select verification method"), the name of the list item (e.g., "verification method option 1"), the position of the list item within the list (e.g., "one of four") and the status of the corresponding checkbox (e.g., "selected").

Document tag 375 and document tag 380 correspond to document tags associated with the signature and date block 360 and a signature tab 365. The document tags include the document text and the action associated with the signature tab in an order that helps screen reader users navigate and execute the signature block more easily. The document tag 375 first indicates the name of the block (e.g., "sign and date"), then the name of the entity required to sign (e.g., "John Doe"), and, finally, the action required of the signing entity (e.g., "sign here"). The document tag 380 first indicates the name of the block (e.g., "sign and date"), the label of the field ("date"), and the action required of the signing entity (e.g., "date here"). This readout is different from a conventional readout which would read the text left-to-right and top-to-bottom and/or a readout based on the time a portion of the document was created (e.g., a signature tab 365 added after the electronic document 305 was created). For example, in a conventional readout, a screen reader may first read "signature, John Doe, date," and would then read "sign here" based on both a conventional readout and a time when the signature tab 365 was added to the electronic document 305. Instead, the electronic document system 110 generates a document tree with document tags that account for the segment type of the signature and date block 360, the signature tab 365 added to the electronic document 305, an action required by the user, and/or the context of the signature and date block 360 within the document.

Additional types of unconventional segments of an electronic may be identified and their corresponding locations inferred by the electronic document system 110. For example, the address label 385 includes multiple fields; however, each field is not placed within a drawn box. In this example, the edges of the field are implied by the adjacent fields and/or the lines surrounding the address label 385. The implied cells may be determined using a heuristic processing technique. In other examples, buttons or other artifacts (such as lines or boxes) may precede or follow a label. The document management system 110 may infer the relationship between the label and the button or artifact.

FIG. 4 is a flowchart of a method 400 for enhancing document readability, according to one embodiment. An electronic document system 110 receives 410 a readout request associated with reading the content of an electronic document by a screen reader application of a client device, such as the screen reader application 150 of the client device 140B associated with the receiving entity 130. In response to receiving the readout request, the electronic document system 110 applies 420 a document component identification model to the electronic document to generate indicia of at least one conventional segment for conventional readout and indicia of an unconventional segment to be read out in a manner different from the conventional readout. In an embodiment, zero conventional segments are identified through this process. Unconventional segments may be a collection of random characters that together form a table, a chart, a form field, a button, a checkbox, or the like. In some embodiments, conventional readout uses left-to-right, top-to-bottom readout. Additionally, conventional readout may use right-to-left, top-to-bottom readout, left-to-right, bottom-to-top readout, right-to-left, bottom-to-top readout, or the like. Moreover, unconventional readout may be based on the indicia of the unconventional segment. For example, the unconventional readout associated with a table may vary from the unconventional readout associated with an individual cell, form field, check box, or the like.

The document component identification model may be a template comparison model, as discussed with reference to FIG. 2. In these embodiments, generating the indicia of conventional segments and indicia of the unconventional segment may include accessing templates associated with a predefined property. The template comparison model compares portions of the electronic document to the templates. Further, the template comparison model identifies at least one segment of the electronic document having the predefined property based on the comparison. In other embodiments, the document component identification model is a machine learning model, as discussed with reference to FIG. 2.

A document tree, representing a readout sequence, is constructed 430 based on the at least one conventional segment and unconventional segment. The document tree represents a readout sequence to be performed by a screen reader, such as screen reader application 150. The electronic document system 110 provides 440 the document tree to a screen reader, which may perform a readout based on the document tree.

In some embodiments, to construct the document tree, the electronic document system 110 generates document tags associated with the at least one conventional segment and the unconventional segment. Each document tag may indicate a segment type of a respective segment. Document tags may include additional information. Additional information may include, but is not limited to a location, a text, a dimension, a geometry, etc., of the segment associated with the document tag, metadata associated with the segment and/or document tag, a tool tip, a grouping, a status of the segment (e.g., checked or unchecked), an order to read form text and input text, or the like.

The electronic document system 110 may update the document tree by adding one or more additional document tags to the document tree that correspond to the unconventional segment. Similarly, the electronic document system 110 may update the document tree by adding one or more additional document tags to the document tree that correspond to additional unconventional segments. For example, the electronic document system 110 may receive an indication that a second unconventional segment has been added to the electronic document. In response, the electronic document system 110 may determine a second document tag associated with the second unconventional segment and update the document tree based on the second document tag. In some embodiments, responsive to receiving an indication that the unconventional segment has been modified, the electronic document system 110 replaces a current document tag associated with the unconventional segment with a new document tag associated with the unconventional segment based on the modification.

Figure 5:
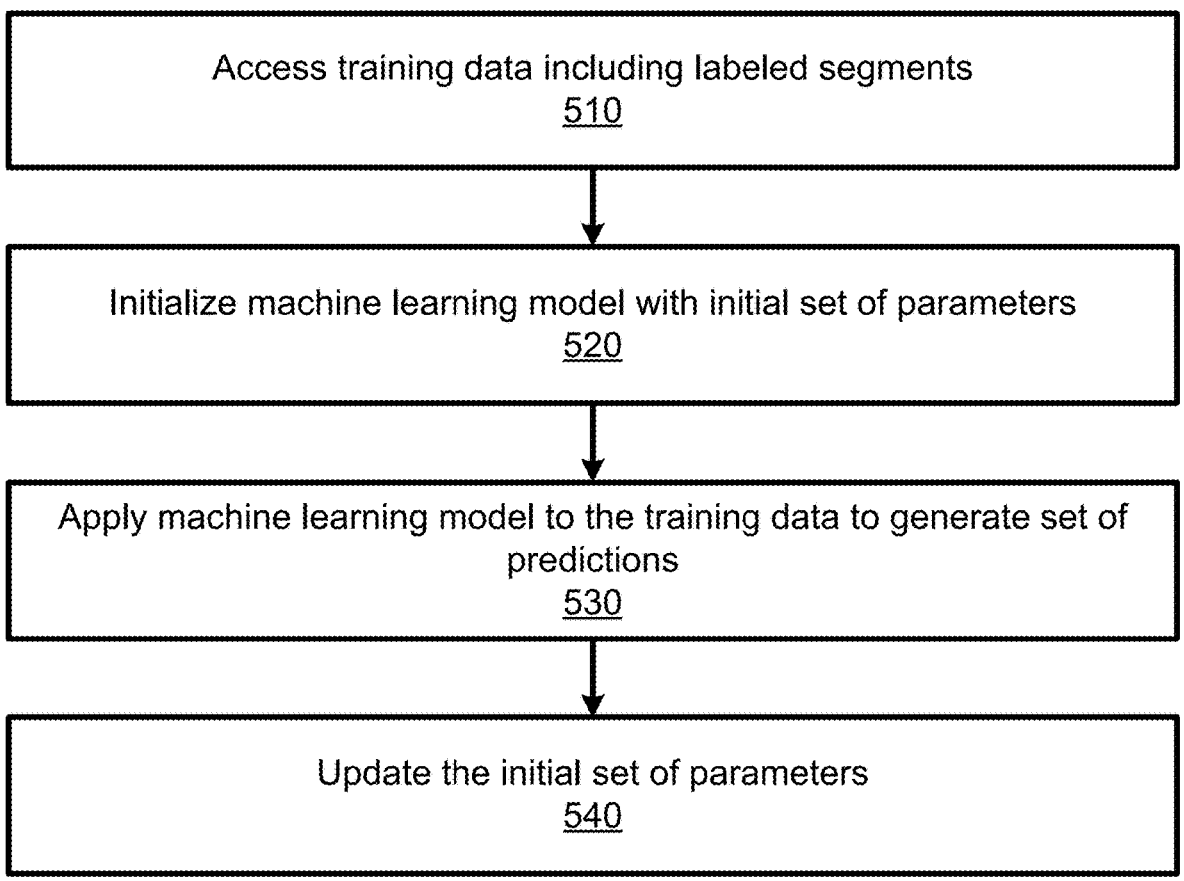
FIG. 5 is a flowchart of a method for training a model for enhancing document readability, according to one embodiment.

FIG. 5 is a flowchart of a method 500 for training a model for enhancing document readability, according to one embodiment. In the embodiment shown, training data is accessed 510. Training data includes labeled segments, such as labeled conventional segments and/or labeled unconventional segments. Each label indicates a segment type of the corresponding labeled segment, such as whether the segment is a conventional segment, an unconventional segment, a table, a form field, a checkbox, a signature line, or the like. Alternatively, or additionally, training data may not include labeled segments, a portion of training data may not include labeled segments, or the like. In these embodiments, the machine learning model may be trained with unsupervised and/or semi-supervised learning.

The machine learning model is initialized 520 with an initial set of parameters. The initial set of parameters may be stored in a data store of the electronic document system 110, accessed from an entity, server, processor, etc., via the network 170, generated by an engine of the electronic document system 110, such as the document component identification engine 230 or the document tree construction engine 240, or the like. The machine learning model is applied 530 to the training data to generate a set of predictions of a segment type for the labeled segments. Predictions may include a classification to a segment type, a probability of a segment type, or the like. The machine learning model is updated 540 based on the set of predictions and the labels associated with the labeled segments.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, from a client device, by an electronic document system, a readout request associated with reading out content of an electronic document by a screen reader application of a client device;

responsive to receiving the readout request, applying, by the electronic document system, a document component identification model to the electronic document, wherein applying the document component identification model comprises generating both an indicia of a conventional segment for conventional readout using left-to-right, top-to-bottom readout and an indicia of an unconventional segment to be read out in a manner different from the conventional readout, wherein the document component identification model comprises a machine learning model that has been trained, wherein training the machine learning model comprises:

accessing training data, the training data including labeled segments, each label indicating a segment type of a respective labeled segment;

initializing the machine learning model with an initial set of parameters;

applying the machine learning model to the training data to generate a set of predictions of a segment type for the labeled segments; and updating the initial set of parameters based on the set of predictions and the labels associated with the labeled segments;

constructing, by the electronic document system, a document tree based on the conventional segment and the unconventional segment, the document tree representing a readout sequence; and providing, by the electronic document system, the document tree to the screen reader application of the client device, wherein the screen reader application, when executed by the client device, is configured to perform a readout based on the document tree.

2. The method of claim 1, further comprising:

generating, by the electronic document system, a document tag for the conventional segment based on the indicia of the conventional segment, the document tag for the conventional segment indicating a first segment type of the conventional segment; and generating, by the electronic document system, a document tag for the unconventional segment based on the indicia of the unconventional segment, the document tag for the unconventional segment indicating a second segment type of the unconventional segment.

3. The method of claim 2, wherein constructing the document tree based on the conventional segment and the unconventional segment further comprises:

adding one or more additional document tags to the document tree that correspond to the unconventional segment.

4. The method of claim 2, wherein constructing the document tree based on the at least one conventional segment and the unconventional segment further comprises:

receiving an indication that the unconventional segment has been modified; and replacing a current document tag in the document tree associated with the unconventional segment with a new document tag associated with the unconventional segment based on the modification.

5. The method of claim 2, wherein the document tag for the unconventional segment is a first document tag for the unconventional segment, the method further comprising:

receiving an indication that a second unconventional segment for the unconventional segment has been added to the electronic document;

determining a second document tag for the unconventional segment; and updating the document tree based on the second document tag for the unconventional segment.

6. The method of claim 1, wherein the document component identification model further comprises a template comparison model, and wherein generating both the indicia of the conventional segment and the indicia of the unconventional segment comprises:

accessing a plurality of templates, each template associated with a predefined property;

comparing portions of the electronic document to the plurality of templates; and identifying at least one segment of the electronic document having the predefined property associated with at least one template based on the comparison.

7. The method of claim 1, wherein the unconventional segment comprises a collection of random characters that together form a chart.

8. The method of claim 1, wherein the unconventional segment comprises a collection of random characters that together form a table.

9. The method of claim 1, wherein the unconventional segment comprises a collection of random characters that together form a signature block.

10. The method of claim 1, wherein the conventional segment comprises a document segment not characterized as an unconventional segment.

11. Non-transitory computer-readable media comprising memory with instructions encoded thereon, wherein the instructions, when executed, cause one or more processors to:

receive, from a client device, a readout request associated with reading out content of an electronic document by a screen reader application of a client device;

responsive to receiving the readout request, apply a document component identification model to the electronic document, wherein the instructions to apply the document component identification model cause the one or more processors to generate both an indicia of a conventional segment for conventional readout using left-to-right, top-to-bottom readout and an indicia of an unconventional segment to be read out in a manner different from the conventional readout, wherein the document component identification model comprises a machine learning model that has been trained, wherein training the machine learning model comprises:

accessing training data, the training data including labeled segments, each label indicating a segment type of a respective labeled segment;

initializing the machine learning model with an initial set of parameters;

applying the machine learning model to the training data to generate a set of predictions of a segment type for the labeled segments; and updating the initial set of parameters based on the set of predictions and the labels associated with labeled segments;

construct a document tree based on the conventional segment and the unconventional segment, the document tree representing a readout sequence; and provide the document tree to the screen reader application of the client device, wherein the screen reader application, when executed by the client device, is configured to perform a readout based on the document tree.

12. The non-transitory computer-readable media of claim 11, wherein the instructions further cause the one or more processors to:

generate a document tag for the conventional segment based on the indicia of the conventional segment, the document tag for the conventional segment indicating a first segment type of the conventional segment; and generate a document tag for the unconventional segment based on the indicia of the unconventional segment, the document tag for the unconventional segment indicating a second segment type of the unconventional segment.

13. The non-transitory computer-readable media of claim 11, wherein the document component identification model further comprises a template comparison model, and wherein the instructions to generate both the indicia of the conventional segment and the indicia of the unconventional segment cause the one or more processors to:
  access a plurality of templates, each template associated with a predefined property;
  compare portions of the electronic document to the plurality of templates; and
  identify at least one segment of the electronic document having the predefined property associated with at least one template based on the comparison.

14. A system comprising:
one or more processors;
memory with instructions encoded thereon that, when executed, cause the one or more processors to:
  receive, from a client device, a readout request associated with reading out content of an electronic document by a screen reader application of a client device;
  responsive to receiving the readout request, apply a document component identification model to the electronic document, wherein the instructions to apply the document component identification model cause the one or more processors to generate both an indicia of a conventional segment for conventional readout using left-to-right, top-to-bottom readout and an indicia of an unconventional segment to be read out in a manner different from the conventional readout, wherein the document component identification model comprises a machine learning model that has been trained, wherein training the machine learning model comprises:
    accessing training data, the training data including labeled segments, each label indicating a segment type of a respective labeled segment;
    initializing the machine learning model with an initial set of parameters;
    applying the machine learning model to the training data to generate a set of predictions of a segment type for the labeled segments; and
    updating the initial set of parameters based on the set of predictions and the labels associated with labeled segments;
  construct a document tree based on the conventional segment and the unconventional segment, the document tree representing a readout sequence; and
  provide the document tree to the screen reader application of the client device, wherein the screen reader application, when executed by the client device, is configured to perform a readout based on the document tree.

15. The system of claim 14, wherein the instructions further cause the one or more processors to:
  generate a document tag for the conventional segment based on the indicia of the conventional segment, the document tag for the conventional segment indicating a first segment type of the conventional segment; and
  generate a document tag for the unconventional segment based on the indicia of the unconventional segment, the document tag for the unconventional segment indicating a second segment type of the unconventional segment.

16. The system of claim 14, wherein the instructions to construct the document tree based on the conventional segment and the unconventional segment cause the one or more processors to:
  add one or more additional document tags to the document tree that correspond to the unconventional segment.

17. The system of claim 14, wherein the document component identification model further comprises a template comparison model, and wherein the instructions to generate both the indicia of the conventional segment and the indicia of the unconventional segment cause the one or more processors to:
  access a plurality of templates, each template associated with a predefined property;
  compare portions of the electronic document to the plurality of templates; and
  identify at least one segment of the electronic document having the predefined property associated with at least one template based on the comparison.

\* \* \* \* \*